March 3, 1964 R. G. HEDTKE 3,123,363
MANURE SPREADER
Filed June 22, 1962 3 Sheets-Sheet 1
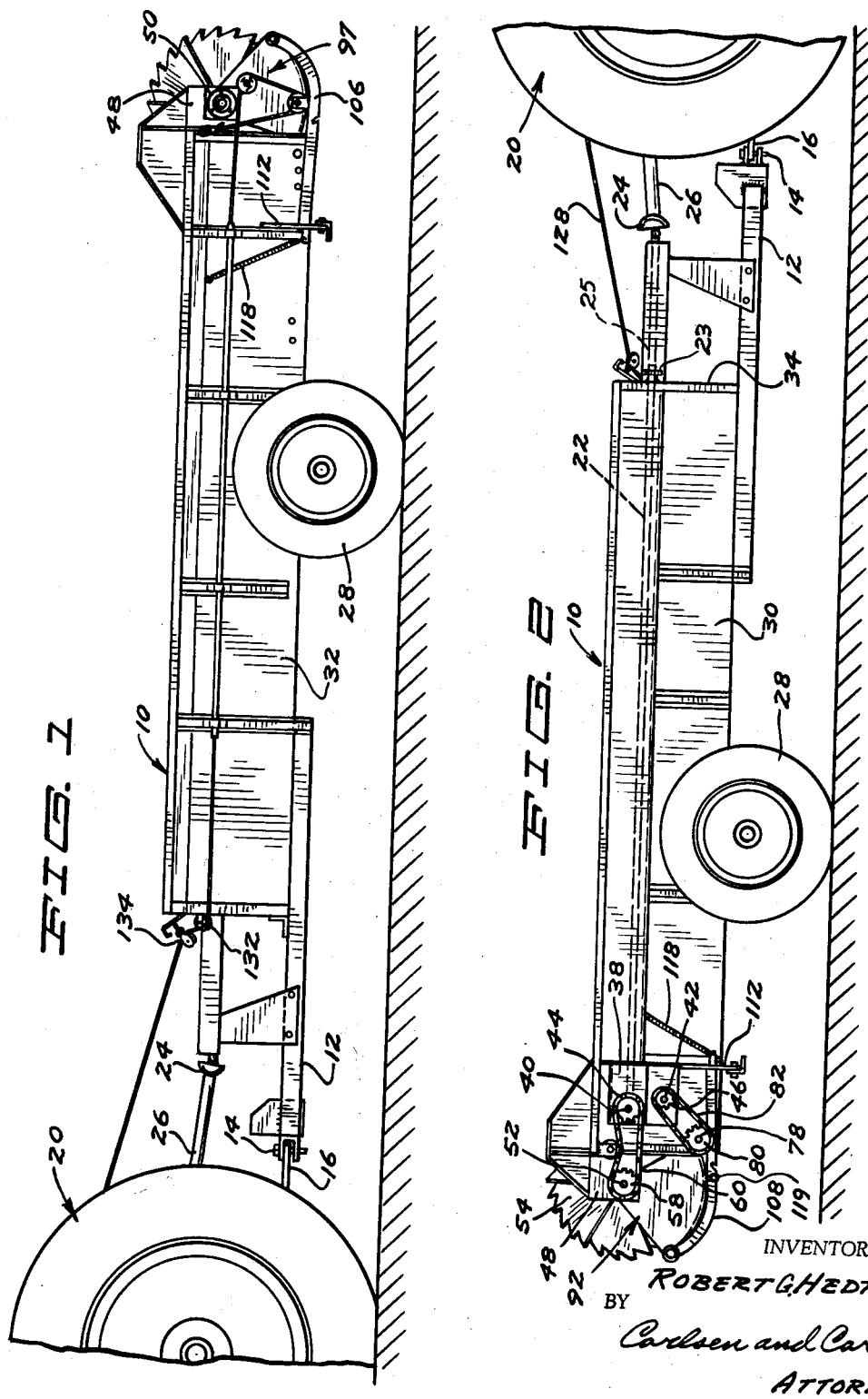
INVENTOR.
ROBERT G. HEDTKE
BY
Carlsen and Carlsen
ATTORNEYS

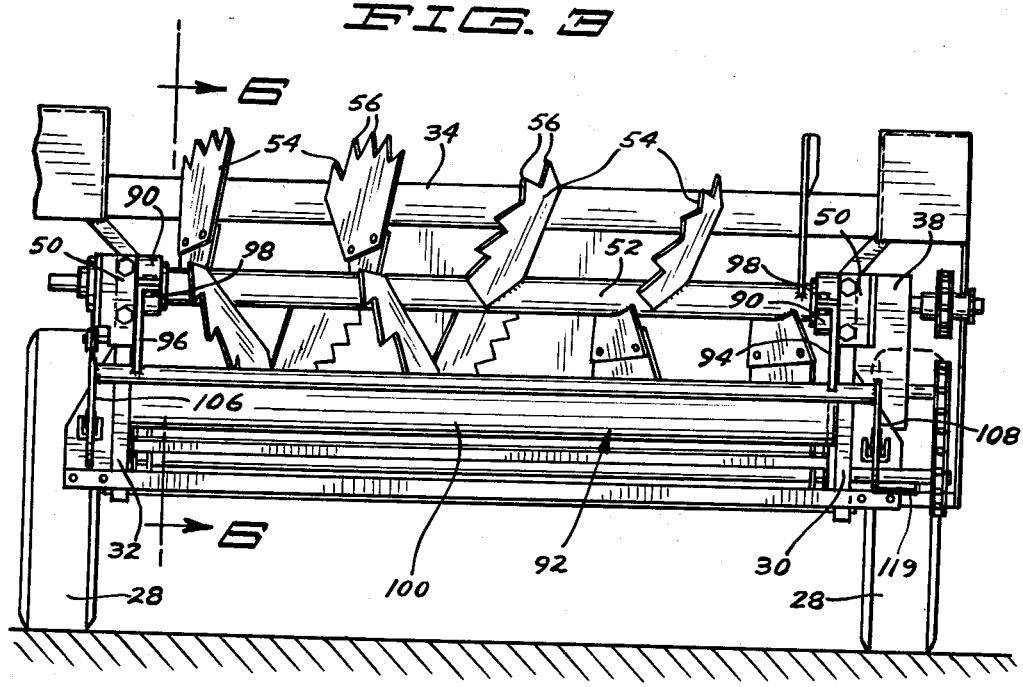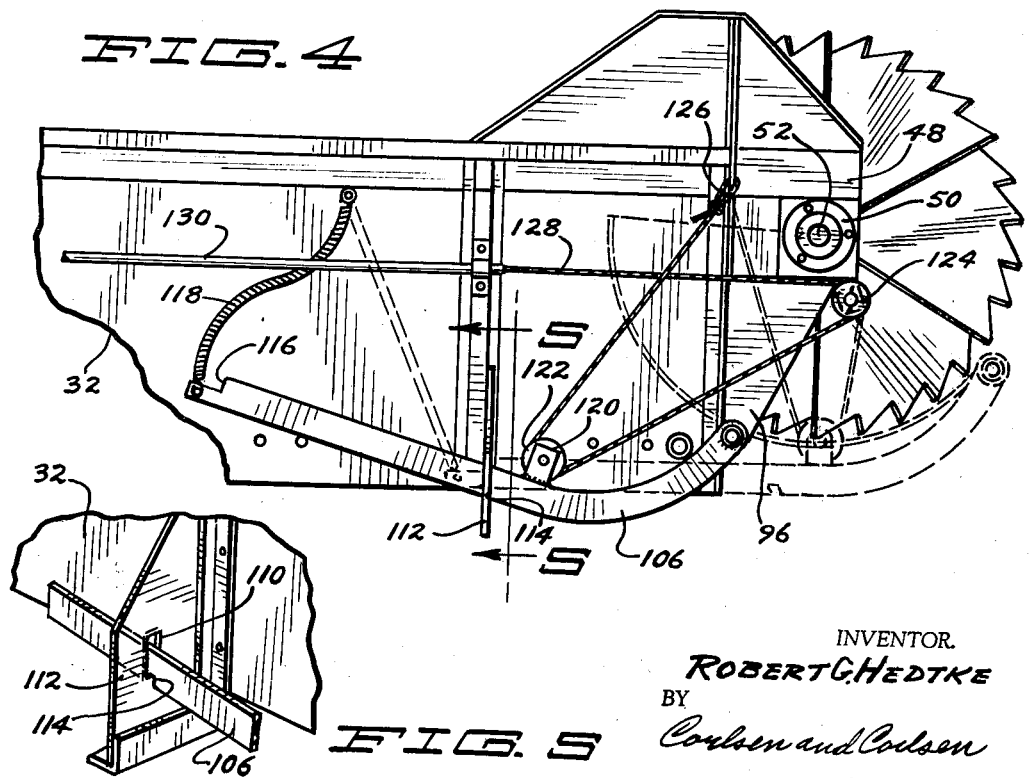

March 3, 1964

R. G. HEDTKE 3,123,363

MANURE SPREADER

Filed June 22, 1962

INVENTOR.
ROBERT G. HEDTKE
BY
Corlsen and Corlsen
ATTORNEYS

United States Patent Office 3,123,363
Patented Mar. 3, 1964

3,123,363
MANURE SPREADER
Robert G. Hedtke, Excelsior, Minn., assignor, by mesne assignments, to Minneapolis-Moline, Inc., Hopkins, Minn., a corporation of Delaware
Filed June 22, 1962, Ser. No. 204,428
1 Claim. (Cl. 275—6)

The present invention relates to agricultural implements and more particularly to manure spreaders and to an improved spreading mechanism therefor.

There are several problems in the manure spreading operation toward which the present invention is directed. The farmer, in many cases, wishes to keep the overall height of the spreader as low as possible due to the limited clearance between the ground and the barn cleaner monorail and bucket loader. Any device which is mounted upon a manure spreader over the beaters or which during some phase of operation swings up over the carriage of the manure spreader, will, in many cases, interfere with the operation of the farmer's loading equipment or limit the capacity of the wagon box.

It has also been found in the past that the liquid or semi-liquid portion of the load is one of the most desirable components of the manure. It is therefore desirable to retain it for proper spreading on the field rather than lose it through leakage in transport or at the time that the manure spreader is being loaded. To prevent such leakage, many spreaders have been provided with a liquid tight wagon box. During operation, however, the rearward end of the manure spreader must be open to allow the load to be moved into the beaters for chopping and distribution onto the field. Thus the problem of leakage has been reduced to the area at the open end of the spreader. There are two leakage problems in this area. The first, is the leakage which occurs in standing or in transport. A number of devices have been proposed for overcoming this problem. The other leakage problem is that which occurs during the actual spreading operation. In operation, the liquid element of the load is often ineffectively picked up by the beater and is intermittently and non-uniformly dropped on the ground during the spreading operation of the solids.

In view of the shortcomings of the prior art, it is thus one object of the present invention to provide an improved manure spreader with a relatively low profile and an improved spreading mechanism which is low in cost, rugged in construction and reliable in operation.

It is yet another object of the present invention to provide for a manure spreader an improved apparatus of a relatively low cost to reduce leakage of the liquid portion of the load when the spreader is standing or being transported.

It is still another object of the present invention to provide an improved manure spreading apparatus wherein leakage is effectively prevented during the spreading operation and wherein the liquid element of the load is effectively picked up by the beater and continuously and uniformly spread onto the ground during the spreading operation.

It is a further object of the present invention to provide an improved manure spreading apparatus wherein the liquid portion of the load is retained in a position wherein it will come into effective contact with the beater blades of the spreader and uniformly spread onto the field with the solid material of the load.

It is yet another object of the present invention to provide an improved manure spreading apparatus characterized by having a relatively low profile and including a shield member for retaining the liquid portion of the load during standing or during transport and also for directing the liquid elements into the beater during the spreading operation.

These and other more detailed and specific objects will be disclosed in the course of the following specification, reference being had to the accompanying drawings, in which—

FIG. 1 is a side elevational view of a manure spreader employing the present invention as seen from the left side.

FIG. 2 is a view similar to FIG. 1 showing the right side of the apparatus.

FIG. 3 is a rear end elevational view of the apparatus.

FIG. 4 is a partial side elevational view of the rearward end of the apparatus as seen from the left side and with the apparatus in the transport position.

FIG. 5 is a partial perspective view showing the latch mechanism employed for releasably locking the shield in the desired position.

A preferred form of the invention includes an improved spreader assembly for a manure spreader including a transversely disposed beater shaft with a plurality of beater blades affixed thereto, including an end gate in the form of a shield member mounted upon the rearward end of the apparatus for movement between a first position interposed between the beater and the load carried in the wagon and a second position wherein the shield is positioned in spaced relationship with the bottom of the beater blades with its forward end adjacent the rearward end of the wagon box. A latch is provided for releasably locking the shield in the first position and a forwardly extending operating means is connected to the latching means and shield for disengaging latching means and moving the shield to the second mentioned position.

The invention will be best understood by reference to the following description and accompanying drawings, wherein the same numerals refer to corresponding parts in the several figures.

Figure 6:
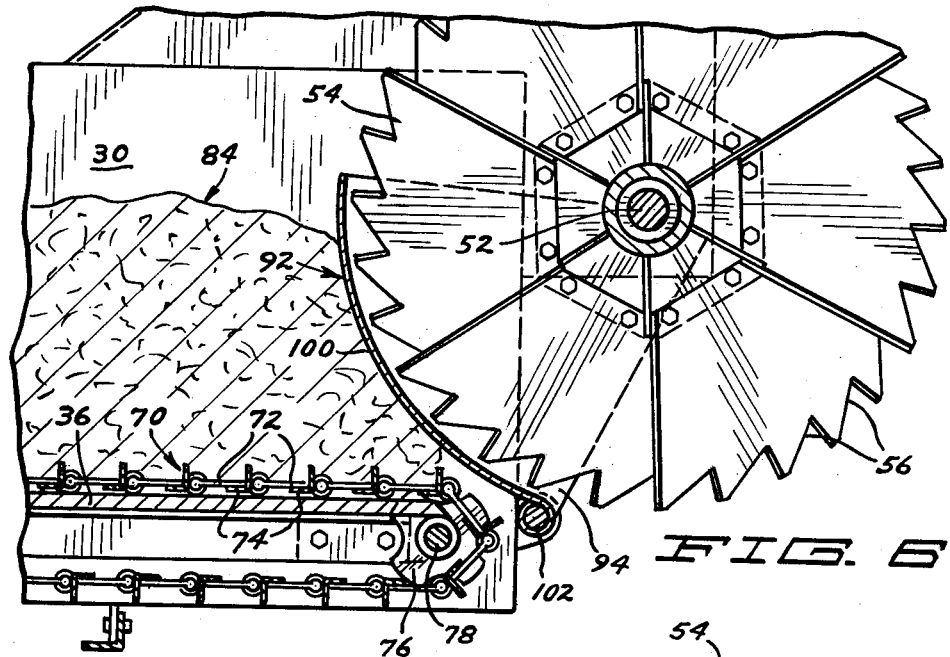
FIG. 6 is a partial vertical sectional view taken along line 6—6 of FIG. 3.
Figure 7:
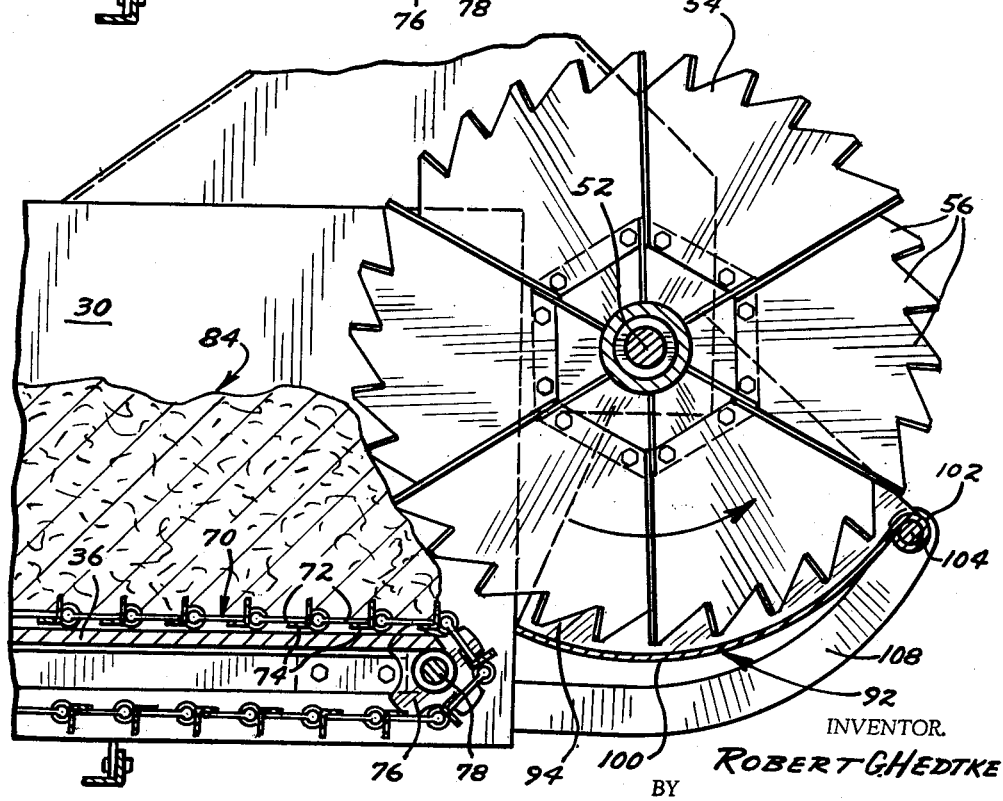
FIG. 7 is a view similar to FIG. 6 but showing the end gate in position for spreading.

Referring now particularly to FIGS. 1, 2, and 3, there is shown a manure spreading apparatus 10 provided with the usual drawbar 12, the forward end of which is pivotally connected by means of a pin 14 to a hitch member 16 affixed to a tractor or other vehicle indicated generally at 20. The spreader is also provided with the usual drive shaft 22 which is journalled on the side of the spreader for rotation about a longitudinally extending axis and is connected by means of a centrally extending drive chain and sprocket assembly 23 to a center shaft 25. The forward end of shaft 25 is connected through a universal joint 24 to a shaft 26 which is in turn coupled to a conventional tractor power take-off (not shown). The wagon 10 is supported upon the ground by means of a pair of wheels 28. The wagon box includes side walls 30 and 32, a forward wall 34 and a bottom wall 36 which is best seen in FIGS. 6 and 7. The side, bottom and forward walls of the wagon box are secured tightly together in a well known and conventional manner to provide a liquid impervious enclosure.

The rearward end of the drive shaft 22 extends into a gear box 38 of a suitable construction best seen in FIGS. 2 and 3. A pair of output shafts 40 and 42 projects laterally from the outward side of the gear box 38, as best seen in FIG. 2, and upon these shafts are mounted chain sprockets designated 44 and 46 respectively. At the upward end of the side of the wagon box is a rearward extension 48. Suitably affixed to each of these extensions is a bearing block 50, one at each side of the apparatus. Rotatably mounted at each end within the bearing blocks 50 is a transversely disposed beater blade support shaft 52. Suitably affixed to the shaft 52 are a plurality of laterally spaced apart blades 54, each preferably provided with a plurality of circumferential serrations, 56. At the right end of the shaft 52, as seen in FIG. 3, is provided a chain sprocket 58. A drive chain 60 is entrained between the sprocket 58 and a sprocket 44, as seen in FIG. 2, to thereby transmit power from the gear box 38 to the sprocket 58, shaft 52 and blades 54. During operation, the shaft 52 and throwing blades are rotated in a clockwise direction as seen in FIG. 1.

As best seen in FIGS. 6 and 7, a conveyor indicated generally at 70 is provided in the bottom of the wagon for transporting the load during operation toward the rearward end of the wagon. The conveyor 70 includes the usual links 72 and cross members 74 and is entrained at its rearward end over a suitable sprocket 76 affixed to a transversely extending shaft 78. Affixed to the outward end of the drive shaft 78 is a sprocket 80 and entrained between the sprocket 80 and sprocket 46 is a drive chain 82 for conveying power from the gear box 38 to the conveyor 70. As seen in FIGS. 6 and 7, a load of manure indicated generally at 84 is moved rearwardly during operation toward the open end of the wagon box by means of the conveyor 70.

As best seen in FIG. 3, a pair of laterally spaced apart support bearings 90 are rotatably mounted upon each end of the shaft 52. Rigidly connected to the support bearings 90 is an end gate or shield indicated generally at 92. The shield 92 includes a pair of parallel, vertically disposed and laterally spaced apart end plates 94 and 96, each having the form of a circular sector. The plates 94 and 96 are rigidly secured as by bolts 98 to the support bearings 90. Extending between the outward ends of the plates 94 and 96 is a shield member 100 having the form of a rectangular section of a cylindrical surface. The member 100 is curved such that its center of curvature corresponds generally with the axis of the shaft 52 whereby the clearance between itself and the beater blades 54 will remain constant in all positions thereof about shaft 52.

Rigidly secured to the rearward end of the shield 92 is a transversely extending tube 102 within which is rotatably mounted a shaft 104. Rigidly connected to the ends of the shaft 104 and extending downwardly and forwardly therefrom are a pair of laterally spaced apart parallel latching bars 106 and 108. Each of the latching bars extends forwardly through a suitable opening 110 within a bracket 112 secured upon each side wall of the wagon box. During operation, as bars 106 and 108 are moved forwardly, the shield 92 will be pivoted about the axis of the shaft 52 to a forward position with the outward surface thereof abutting against the rearward portion of the load as shown in FIG. 6. When the bars 106 and 108 are moved rearwardly, the shield 92 will be pivoted to an operating or beating position with the forward end thereof positioned adjacent to the rearward end of the conveyor 70 as best shown in FIG. 7. With the shield 92 in the position shown in FIG. 6, the solid as well as the liquid portions of the load will be effectively retained within the wagon during standing, loading and transport. Even though a small space is present between the outward surface of the member 100 and the rearward end of the conveyor 70, it was found that only a negligible amount of leakage of the liquid portions of a load took place.

When the shield 92 is moved to the operating position shown in FIG. 7 and with the conveyor and beater in operation, both the solid and liquid elements of the load will be effectively picked up by the beater as they move rearwardly on the conveyor 70 and continuously and uniformly thrown from the apparatus during the spreading operation. As the beater blades 54 rotate at high speed, a portion of the liquid material passing into the beater will drain downwardly and be caught by the shield 94.

The liquids thrown onto the shield 92 will be picked up, a small amount at a time, by the serrated ridges of the beater blades and thrown rearwardly in a continuous and uniform spray thereby insuring even distribution. At least a portion of the liquids will, however, be thrown forwardly onto the portion of the load which remains in the wagon. This mixing of liquid and solids will also help to assure more uniform distribution of the liquids on the field.

A recess 114 is provided in the lower edge of each of the latching bars 106 and 108 for engagement with the lower edge of the opening 110 when the shield 92 is in its forward or retracted position. A notched recess 116 is provided at the forward end of the members 106 and 108 for engagement with the upward portion of the opening 110 when the shield 92 is moved to its rearward or operational position as best seen in FIGS. 1 and 2. A resilient member, such as a spring 118, is connected to the forward end of each of the latching bars 106 and 108 and the upward portion of each of the side walls 30 and 32. A handle 119 is secured to the latching bar 108 for enabling an operator to move the shield forward at the end of the spreading operation.

A bracket 120 is provided upon the latching bar 106 near its center. Upon the bracket 120 is rotatably mounted a pulley 122. At the lower end of the extension 48, at the left side of the apparatus, is rotatably mounted a pulley 124. Entrained over the pulleys 122 and 124 is a cable 128. Cable 128 is secured at its rearward end 126 to the side wall 32 above the latching bar 106 and extends forwardly through a casing 130. The forward end of the cable 128 extends over pulleys 132 and 134 to the tractor 20.

During loading and transport, the shield 92 will be normally positioned as shown in FIGS. 4 and 6. When the tension is exerted upon the cable 128 by an operator, the resultant upward force upon the bracket 120 will lift the latching bar 106 so that the recess 114 is disengaged from the lower end of the opening 110 and thereafter will draw the latching bars 106 and 108 rearwardly to the dotted line position of FIG. 4 and the solid line position of FIGS. 1, 2 and 7. As the latching bars and the shield 92 reach their rearwardmost position, the spring 118 will be placed under tension so that when the recess 116 at the forward end of the latching bars 106 and 108 engages the opening 110, the tension of the spring 118 will yieldably bias the recesses 116 into engagement with the upward portion of the opening 110 thereby retaining the latching bars in the operating position. In this way the operator can quickly and easily move the shield 92 to the operating position of FIGS. 1, 2 and 7 from the seat of the tractor and once the operating position has been reached, the latching bars 106 and 108 will reliably retain the shield 92 in the desired position. After the spreading operation is completed, the operator can move the latch members and shield to the forward position shown in FIGS. 4 and 6 by applying a force with his foot to the handle 119.

By means of my invention, I have provided a manure spreading apparatus which will effectively and reliably prevent significant leakage materials from the manure during standing and transport. Furthermore, my invention provides an effective means for eliminating the leakage of wet, semi-solid materials during the spreading operation and will also assure continuous and uniform distributing of the liquids during the spreading operation.

It is understood that suitably modifications may be made in the structure as disclosed, provided such modifications come within the spirit and scope of the appended claim. Having now therefore fully illustrated and described my invention, what I claim to be new and desire to protect by Letters Patent is:

A manure spreading apparatus comprising in combination, a wagon box adapted to support a load of manure, beater blades mounted for rotation about a transverse axis at the rearward end of said box, a means for imparting rotary movement to said blades, a means for conveying the load from said wagon rearwardly toward the beater blades and a shield member including a transversely positioned shield member mounted at the rearward end of said wagon box for selective movement between a first position wherein said shield member is interposed between said beater blades and said load, and a second position wherein said shield member is spaced downwardly from the lower portion of said beater blades, a latch assembly pivotally secured at its rearward end to said shield member and extending forwardly therefrom, said latch assembly including means thereon adapted to releasably engage said wagon box for selectively retaining said shield in either of said positions, said latching assembly comprising a pair of longitudinally extending laterally spaced apart latching bars pivotally connected at their rearward ends to said shield member, and a resilient member being connected between each of said latching bars and said wagon box for yieldably retaining each of said latching bars in a latched position when said bars and said shield member are moved to said second position.

References Cited in the file of this patent
UNITED STATES PATENTS

| | | |
|---|---|---|
| 696,643 | Kinney | Apr. 1, 1902 |
| 794,513 | Kniffen | July 11, 1905 |
| 842,238 | Park | Jan. 29, 1907 |
| 920,260 | Brown | May 4, 1909 |
| 1,435,766 | Varland | Nov. 14, 1922 |
| 1,777,127 | Oreland | Sept. 30, 1930 |
| 2,597,052 | Barker | May 20, 1952 |
| 2,885,209 | Brueker | May 5, 1959 |
| 3,011,793 | McElhinney et al. | Dec. 5, 1961 |